(12) United States Patent
Hoogland

(10) Patent No.: US 8,360,769 B2
(45) Date of Patent: Jan. 29, 2013

(54) APPARATUS FOR MANUFACTURING PRODUCTS FROM A THERMOPLASTIC MASS

(75) Inventor: Hendricus Antonius Hoogland, Krommenie (NL)

(73) Assignee: ECIM Technologies B.V., Zaandam (NL)

( * ) Notice: Subject to any disclaimer, the term of this patent is extended or adjusted under 35 U.S.C. 154(b) by 0 days.

(21) Appl. No.: 13/018,960

(22) Filed: Feb. 1, 2011

(65) Prior Publication Data

US 2011/0123662 A1 May 26, 2011

Related U.S. Application Data

(60) Continuation of application No. 12/321,425, filed on Jan. 21, 2009, now Pat. No. 7,891,970, which is a division of application No. 10/527,364, filed as application No. PCT/NL03/00630 on Sep. 10, 2003, now Pat. No. 7,504,059.

(30) Foreign Application Priority Data

Sep. 10, 2002 (NL) .................................... 1021421

(51) Int. Cl.
    *B29C 45/56* (2006.01)
(52) U.S. Cl. ...................................... 425/577; 425/589
(58) Field of Classification Search .................. 425/577, 425/589, 595

See application file for complete search history.

(56) References Cited

U.S. PATENT DOCUMENTS

| | | | |
|---|---|---|---|
| 3,195,186 A * | 7/1965 | Gauban et al. ................. | 425/595 |
| 3,208,105 A * | 9/1965 | White ............................ | 425/589 |
| 4,184,835 A | 1/1980 | Talbot | |
| 4,522,778 A | 6/1985 | Baciu et al. | |
| 4,778,632 A | 10/1988 | Bakalar | |
| 4,980,115 A | 12/1990 | Hatakeyama et al. | |
| 5,049,344 A | 9/1991 | Sorensen | |
| 5,110,283 A * | 5/1992 | Bluml et al. ................... | 425/595 |
| 5,352,394 A * | 10/1994 | Fujita et al. .................... | 425/589 |
| 5,375,991 A * | 12/1994 | Rydmann et al. ............. | 425/595 |
| 5,424,017 A | 6/1995 | Hinduja et al. | |
| 5,512,221 A | 4/1996 | Maus et al. | |
| 5,529,483 A | 6/1996 | Abe et al. | |

(Continued)

FOREIGN PATENT DOCUMENTS

| | | |
|---|---|---|
| EP | 0425060 | 5/1991 |
| EP | 0999023 | 5/2000 |

(Continued)

OTHER PUBLICATIONS

Rosato et al., Injection Molding Handbook 3rd Edition, Boston: Kluwer Academic Publishers, pp. 60, 224, 264, 262, (2000).

(Continued)

*Primary Examiner* — James Mackey
(74) *Attorney, Agent, or Firm* — Hoffmann & Baron, LLP

(57) ABSTRACT

An apparatus for manufacturing products from material which is thermoplastically deformable, as from plastic, comprising: —a mold (2) with at least one mold cavity (3); —in the or each mold cavity (3) at least one slide (8); —movement means for moving each slide (8); —closing means for opening and closing the mold (2); —feed means for introducing, with the mold cavity (3) closed, said material in at least substantially plastic condition into the or each mold cavity; wherein the movement means (9) for moving the slide (3) are arranged for moving said slide forward at a relatively high speed relative to the movement speed of the mold parts upon opening and closing thereof, from a position at least partly retracted from the mold cavity, such that said material, as a result, is displaced in the mold cavity for obtaining the filling thereof, preferably at a speed high such that adiabatic heat development occurs in the or each mold cavity.

20 Claims, 4 Drawing Sheets

U.S. PATENT DOCUMENTS

| | | |
|---|---|---|
| 5,725,819 A | 3/1998 | Onishi et al. |
| 5,993,719 A | 11/1999 | Abe et al. |
| 6,010,656 A | 1/2000 | Nomura et al. |
| 6,248,281 B1 | 6/2001 | Abe et al. |
| 6,439,871 B1 | 8/2002 | Saito et al. |
| 6,832,908 B2 * | 12/2004 | Schaefer ................ 425/595 |

FOREIGN PATENT DOCUMENTS

| | | |
|---|---|---|
| JP | 58211424 | 12/1983 |
| JP | 06126790 | 5/1994 |
| JP | 06328489 | 11/1994 |
| JP | 08244081 | 9/1996 |

OTHER PUBLICATIONS

Avery, Injection Molding Alternatives: A Guide for Designers and Project Engineers, ISBN: 1-56990-251-8, pp. 133 and 136 (1998).

* cited by examiner

APPARATUS FOR MANUFACTURING PRODUCTS FROM A THERMOPLASTIC MASS

CROSS-REFERENCE TO RELATED APPLICATIONS

This application is a continuation application of U.S. application Ser. No. 12/321,425, filed Jan. 21, 2009, now U.S. Pat. No. 7,891,970, which is a divisional application of U.S. application Ser. No. 10/527,364, filed Apr. 27, 2005, now U.S. Pat. No. 7,504,059, which claims the benefit of International Application No. PCT/NL2003/00630, filed on Sep. 10, 2003, which claims priority to NL1021421, filed Sep. 10, 2002.

BACKGROUND OF THE INVENTION

The invention relates to an apparatus for manufacturing products from an at least thermoplastically deformable material. Such a method is known, for instance, as injection molding.

With known injection molding techniques, as a rule, the material to be formed such as plastic is heated in a plasticizing device to a temperature such that the material becomes virtually liquid, at least plastic and low-viscous, whereupon the material is introduced under high pressure into a mold cavity of an injection molding mold. In this mold cavity, the material is distributed such that the mold cavity is completely filled, whereupon the material is allowed to cure by cooling down. Thereupon, the product is taken out by opening the mold and ejecting the product.

For such known injection molding techniques, a particularly high feed pressure is to be used, especially when thin-walled products are formed, in particular if the flow paths in the mold cavity closely approach the melt flow index (MFI) of the materials to be used. Therefore, the same holds in particular when the flow paths in the mold cavity are relatively long. It is clear that with plastics with a high viscosity and/or a low melt flow, these problems occur to a larger extent. As a result, limitations are imposed on the minimum and maximum sizes of products, in particular on lengths of flow paths, on passage widths of such flow paths, on the duration of the injection molding cycles, on the materials to be used and on the minimum wall thicknesses of products, in particular of large, flat parts.

The use of compression molding is already known. Here, into a mold cavity of a partly open mold, an amount of plastic is introduced, required for forming a desired product in this mold cavity. After the plastic has been introduced into the mold cavity, the mold is closed further, so that the plastic is pushed away for filling the further mold cavity. Therefore, with such an apparatus, at the start of the introduction of the plastic, the mold parts are to be held partly away from each other, and only afterwards to be brought onto each other relatively slowly but with high pressure. The danger exists that then, the plastic is not uniformly distributed, so that, for instance, a part of the material can be pressed sideways from the mold cavity before the mold cavity is completely closed. Also, the danger exists that insufficient or, conversely, too much plastic is introduced into the mold cavity. In this latter case, skin formation will occur between the mold halves and, moreover, it will not be possible to close the mold completely. This leads to irregularly formed products and, moreover, to pollution of the mold. A further disadvantage of this apparatus is that when materials are used with a low viscosity and/or with shallow mold halves, the material flows from the mold cavity before the mold halves are moved together, so that the earlier mentioned problems occur to an even larger extent.

SUMMARY OF THE INVENTION

The object of the invention is to provide an apparatus of the type described in the opening paragraph, wherein in a simple manner and with relatively low closing pressures, products can be manufactured having at least parts with a relatively limited wall thickness.

A further object of the invention is to provide an apparatus of the type described in the opening paragraph, wherein different materials can be processed, in particular plastics, in particular also plastics with a high melt, i.e. plastics with a low viscosity in plastic state.

A still further object of the invention is to provide a method with which, in a relatively rapid and simple manner, products can be manufactured, with relatively simple means, which products, moreover, can have relatively large, thin-walled surfaces, in particular products with wall thicknesses which are relatively small and flow paths which are relatively long, smaller or longer, respectively, than matching the melt flow index associated with the material from which the product is manufactured.

The invention further contemplates providing an improved use of an injection mold with a slide.

A number of these and many other objects are achieved with an apparatus, method and/or use according to the invention.

An apparatus according to the invention is characterized by a mold with at least one mold cavity; wherein in the or each mold cavity at least one movable part, to be called slide, is provided; movement means for moving the slide; closing means for opening and closing the mold such that the mold cavity is released or closed, respectively; feed means for introducing, with the mold cavity closed, said material in at least substantially plastic condition into the mold cavity; wherein the movement means for moving the slide are arranged for moving said slide forward in the mold cavity at a relatively high speed relative to the movement speed of the mold parts upon their opening and closing, from a position at least partly retracted from the mold cavity, such that, as a result, said material is displaced in the mold cavity for obtaining the filling thereof, said slide moving at a speed sufficiently high such that adiabatic heat development occurs in the mold cavity.

With an apparatus according to the invention, a thermoplastic material such as a plastic, in particular a thermoplastic plastic, can be introduced into a mold cavity while the mold as such is closed and the or each slide is in, or is being brought into, a retracted position at introduction of the material, so that the volume of the mold cavity is relatively large with respect to the volume of the product to be eventually formed. After the material has been introduced entirely or, preferably, substantially into the mold cavity, the or each slide can be moved forcefully and, in particular, with speed into the mold cavity, at least into the material introduced therein, so that this is pushed away. With it, a speed is developed such that, as a result of the movement of the or each slide, heat development occurs in the material. To that end, the movement means are designed such that the slide can move at the desired high speed and with the desired accuracy.

Preferably, the movement means and the slide are designed such that adiabatic heat development occurs, so that the temperature in the material rises above the melting temperature of the respective material.

In an advantageous embodiment, the closing means are included at least partly in or on the mold, preferably such that no press is required or that a press without guide rod can suffice. Optionally, also, blocking means can be provided on the mold for holding the mold in closed condition during introduction of the material and displacement of the or each slide.

With an apparatus according to the invention, the mold can be held closed with relatively little closing pressure and the plastic can be introduced, in comparison with a conventional injection molding apparatus. By way of illustration: with conventional injection molding, feed pressures of between, for instance, 350 bars and 1000 bars or more are used, with closing pressures of, for instance, 0.25 to 1.25 ton/cm², depending on, in particular, the material used, the wall thickness and the maximum flow path. With a method according to the invention, for comparable products, a feed pressure of, for instance, between 0 and 200 bars excess pressure can suffice, while relatively low pressures are preferred, for instance of some tens of bars or less. In the Table, an operating pressure of approximately 300 bar (operating pressure of the cylinders of the slides) is given, while the closing pressure can be, for instance, less than 0.2 ton/cm². With polypropylene, for instance, a closing pressure of 0.025 to 0.1 ton/cm² instead of between 0.25 to 1.25 ton/cm² can suffice.

Without wishing to be bound to any theory, this appears, in particular, to be the result of the insight that by temporarily increasing the volume of the mold cavity, at least when introducing the larger part of the material such as the plastic into the mold cavity, the relation between the length of the flow paths and their passage, substantially determined by the minimum wall thickness of the product to be formed, becomes more favorable, so that the material experiences relatively little counter pressure in the mold cavity, while the injection opening or openings are so small that upon movement of the slide or slides, the material is not pushed back through this opening or these openings. Moreover, then, the advantage appears to be achieved that due to the high speed of the or each slide, as a result of friction, so much heat is introduced into the material that solidification of the material, in particular against the mold parts and in the flow front thereof, is undone so that the viscosity of the material is reduced again, while the remaining length of the flow paths for this flow front at the start of the movement of the or each slide has been considerably reduced relative to the original length thereof. As a result, the material can be distributed in the entire mold cavity with less pressure. As the mold is then closed, in a simple manner, the material is prevented from flowing away prematurely.

Surprisingly, it has appeared that then, a high feed rate is particularly advantageous. For instance, a feed rate can be used of between 100 and 2000 mm/s, more in particular of between 500 and 1000 mm/s. This rate is selected depending on the solidification rate of the plastic used, while it holds that the more quickly the plastic solidifies, the higher the feed rate is chosen to be. Moreover, the rate is selected depending on the mold geometry and, in particular, the de-aeration, such that undesired pressure increase in the mold cavity by compression of air is prevented.

With a mold according to the invention, in the movement means, preferably, wedge-shaped elements are used which, viewed from the mold cavity, are moved behind the or a slide, such that the respective slide is moved as a result of the wedge-shape. In particular, then, for each slide at least two wedge-shaped elements are used which are pushed in opposite directions behind the slide so that a symmetrical load is obtained. Through the use of such wedge-shaped elements a favorable distribution of forces is obtained and the slides can be moved over the desired distance with relatively little force.

In a mold according to the invention, preferably, at least one slide is provided at the location where the smallest wall thickness is provided in a product and/or at the location where the flow paths have the greatest length and/or at the location where the flow paths have the greatest complexity. By retracting the slides in those parts upon injection of the plastic, at least moving them partly from the mold cavity, additional space is created for allowing the plastic to pass exactly at the location where the plastic experiences the most resistance or at the location where excessive pressures would be necessary for allowing the plastic to pass. This holds in particular at the location where already some solidification of the plastic occurs. The adiabatic heat introduced later causes the plastic to flow further, while, moreover, the displacement of the slide effects the further movement of the plastic. Furthermore, with such a mold, relatively large, thin-walled product parts can be obtained with wall thicknesses that cannot be obtained with conventional injection molding technique.

Slides in a mold according to the invention can have a frontal surface which is relatively large in relation to the projected surface of the product. Herein, projected surface is understood to include the surface of the product projected on a plane at right angles to the closing direction of the mold. For instance, the frontal surface of the slide can be more than 20% of this projected surface. Surfaces of more than 50%, for instance of 75%, 85% or 95% or more are possible. With this, the advantage is achieved that in a major part of the mold cavity, the space for primary flow of the material to be formed is increased, while, eventually, thin-walled products can be manufactured. As a result of this as well, the feed pressure and the closing pressure can be kept even lower.

The invention further relates to a method for forming products, wherein, in a mold cavity, an amount of plastic is introduced in substantially plastic condition, whereupon at least one movable element to be called a slide is moved at least partly into the respective mold cavity while compressing and/or displacing at least a part of the plastic, while the speed of movement of the at least one slide is so high that adiabatic heat development occurs in the plastic, such that the plastic becomes more liquid, at least its viscosity is decreased.

With such a method, in a rapid and simple manner, plastic products can be manufactured, while low pressures can be used for injection of the plastic as well as closure of the mold. As low injection pressures can be used, the advantage can be achieved that no undesired chemical or mechanical changes occur in the plastic, in particular separation in the different monomers or polymers, while the closing pressure can be kept low, which is advantageous from a point of view of costs. The fact is that for that purpose, simpler apparatuses are suitable, while moreover, the mechanical load is lower and less wear will occur. A further advantage thereof is that, in principle, less space is required for such an apparatus.

With a method according to the invention, plastic is introduced into the mold cavity while the or each slide is retracted therefrom at least partly or is pushed back upon injection, so that additional flow space is obtained. This has already been discussed hereinabove with reference to an apparatus according to the invention. Thus, the resistance the plastic experiences is reduced, so that the injection pressure can be kept low, for instance largely below the standard injection pressure for conventional injection molding of a similar type of product from the same plastic. Such standard pressures can be read from standard tables and, as a rule, are dependent on the plastic and the manner of injection, the projected surface of the products to be formed jointly and the wall thicknesses. As a result thereof, the closing pressure can also be kept low in relation to conventional injection molding, readable from the same or comparable tables on the basis of substantially the same quantities. This is directly clear to the skilled person.

With a method according to the invention, after the mold cavity has been at least substantially filled, the or each slide is moved rapidly into the mold cavity, such that the eventual product shape is obtained. The speed of the or each slide is then set such that adiabatic heat development occurs in the plastic, so that the temperature is increased again to approximately the melting temperature of the plastic. As a result, partially solidified material will become liquid again and be pushed further into the mold cavity, while, furthermore, the remaining flow paths are relatively short so that relatively thin product parts can be formed.

With a method according to the invention, the rate of movement of the or each slide is preferably high, such that the complete movement of the slides is carried out in a fraction of the cycle time of a product cycle, for instance in less than 10%, more in particular in less than 3% of the cycle time, preferably less than some tenths or hundredths of seconds, more in particular microseconds. As stated, this rate is set such that the desired temperature increase occurs, while the plastic properties are prevented from being adversely thermally influenced.

With a method according to the invention, the distance between the end of the or each slide, leading in the direction of movement and facing the mold cavity in the retracted position, at least partly moved from the mold cavity, and an oppositely located wall part of the mold cavity or slide is set depending on at least the melt of the plastic, i.e. the viscosity of the plastic upon injection. Surprisingly, it has appeared that, preferably, at a higher melt, i.e. a higher viscosity, the distance is to be slightly greater than with a lower melt. Without wishing to be bound to any theory, this appears to be the result of the fact that the plastic with the higher melt will solidify sooner and the plastic with the lower melt has a more disadvantageous MFI. For any plastic/mold combination, the optimal distance can be determined in a simple manner by way of experiments.

The invention further relates to a use of a mold for forming products, and a product.

BRIEF DESCRIPTION OF THE DRAWINGS

In clarification of the invention, exemplary embodiments of an apparatus, method, use and product will be described with reference to the drawing. In the drawing.

DETAILED DESCRIPTION OF THE PREFERRED EMBODIMENTS

Figure 1:
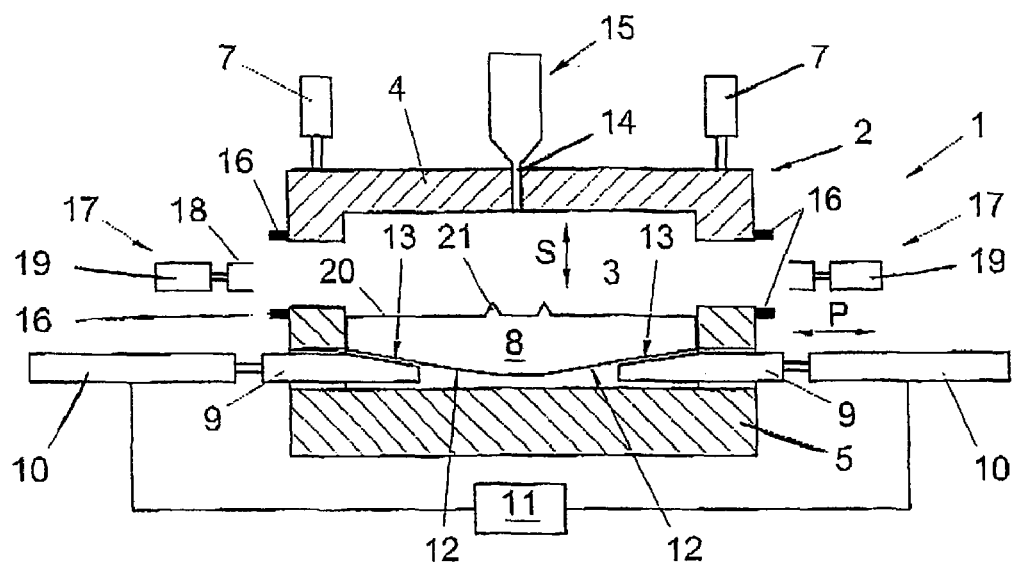
FIG. 1 shows, in partly cross-sectional side view, an apparatus according to the invention, with partly opened mold.

In this description, identical or corresponding parts have identical or corresponding reference numerals. The embodiments shown are only given by way of example and should not be taken as being limitative in any way.

FIG. 1 shows, in cross-sectional side view, an apparatus 1 according to the invention, provided with a mold 2 with a mold cavity 3 therein. The mold comprises a first, moveable part 4 and a second, complementary part 5, fixedly arranged. The moveable part 4 is guided by suitable guides, which are not shown but can, for instance, be sliding pins, rails, guide rods or a press or the like and which are directly clear to the skilled person. The moveable part is moveable with the aid of devices suitable to that end, represented in FIGS. 1-3 as piston-cylinder assemblies 7. It is clear that this may be any suitable device, for instance also a simple press, screw means such as spindles as shown in FIG. 4, link systems or the like. These can be of relatively light design as they are only meant for moving the part 5, virtually not for absorbing tensile or pressure forces in the further cycle.

Figure 2:
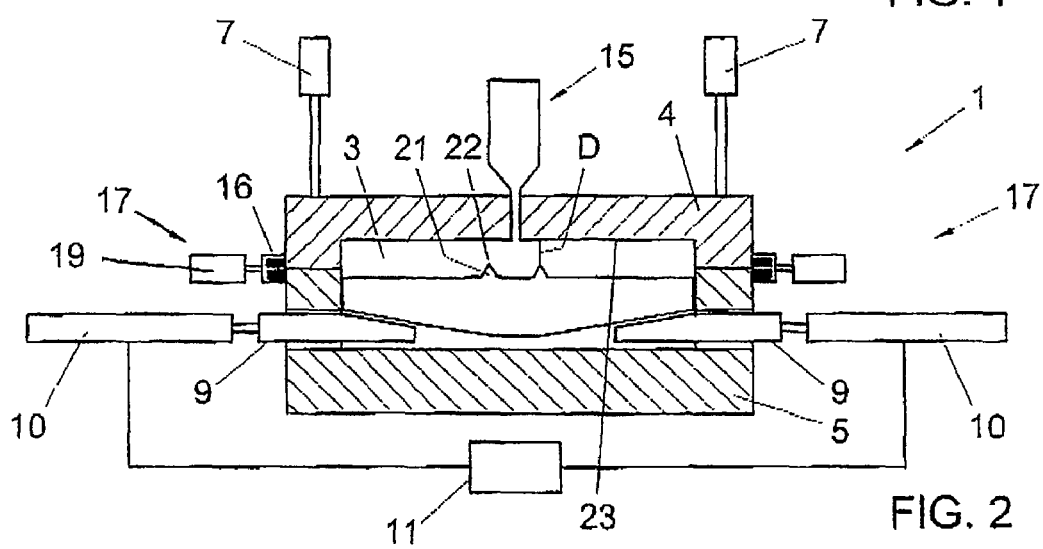
FIG. 2 shows, in partly cross-sectional side view, an apparatus according to the invention, with a closed mold and retracted slide.
Figure 3:
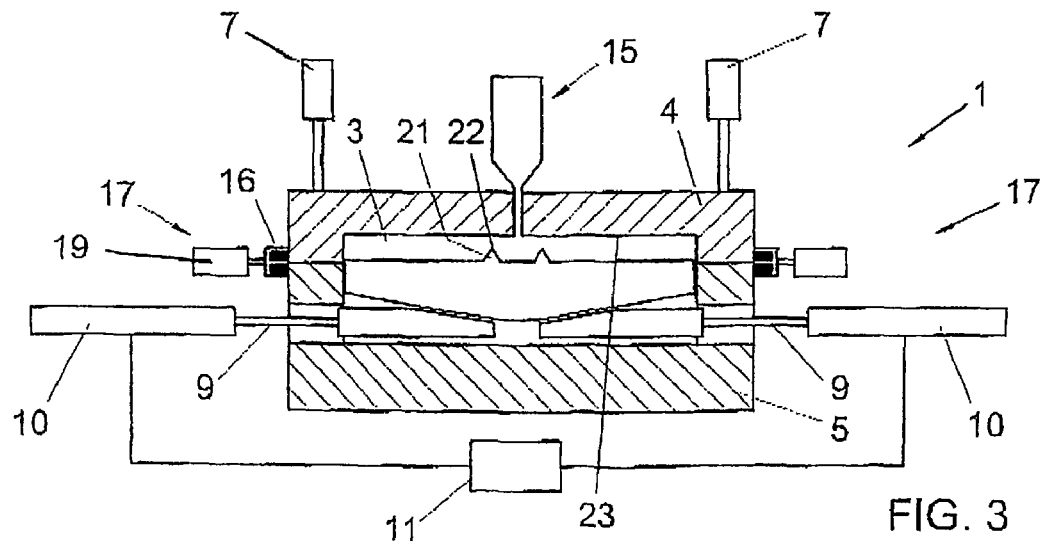
FIG. 3 shows, in partly cross-sectional side view, an apparatus according to the invention, with a closed mold and forwardly moved slide.
Figure 4:
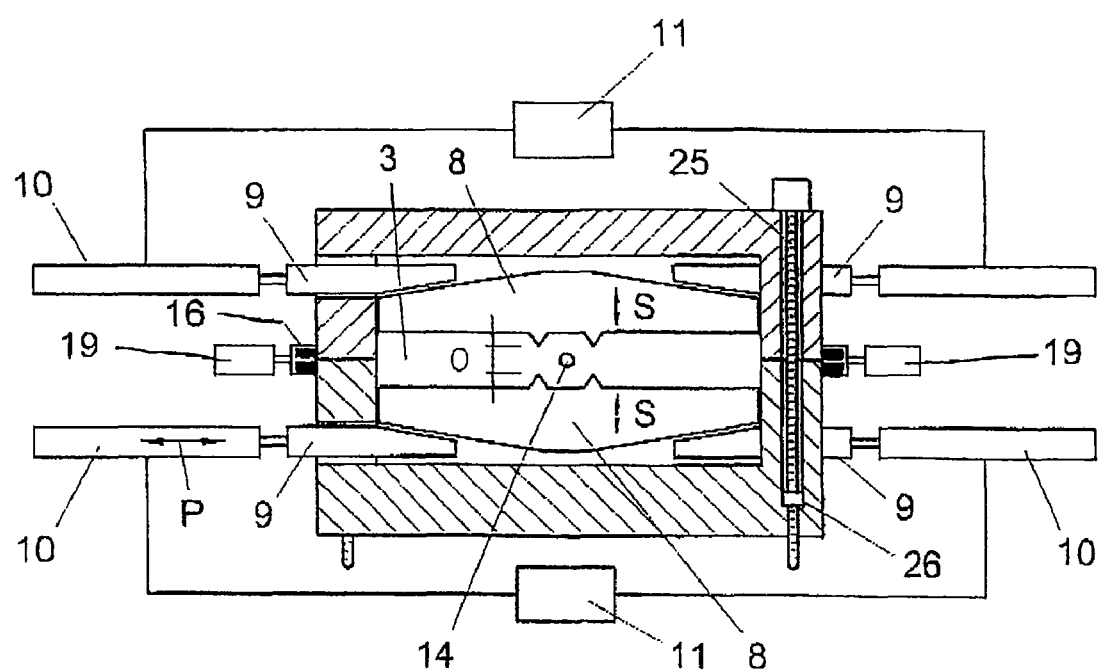
FIG. 4 shows, in partly cross-sectional side view, an alternative embodiment of an apparatus according to the invention.

In the fixed part 5, a slide 8 is provided, moveable in the direction S between a retracted position shown in FIGS. 1 and 2, and an extended position shown in FIG. 3. For moving the slide 8, two wedges 9 are provided, to be called wedge-shaped elements, which are moveable in a direction P with the aid of piston-cylinder assemblies 10 which are, for instance, hydraulically driven from a central control unit 11. The wedges 9 move in the direction P approximately at right angles to the direction S. At the underside, the slide 8 is provided with two surfaces 12 inclining in opposite directions, complementary to the top surfaces of the wedges 9, such that if the wedges 9 are moved inwards, towards each other, the slide 8 is moved upwards (directions viewed in the plane of the drawing) towards the extended position and vice versa.

An inflow opening 14 terminates in the mold cavity 3 and is connected to an injection device 15, for instance a plasticizing device and, optionally, a pressing device. On both parts 4, 5 of the mold 2, flanges 16 are provided which, with the aid of blocking means 17, can be pressed and held onto each other, for keeping the mold closed. To that end, in the embodiment shown, the blocking means comprise brackets 18 which are moveable with the aid of piston-cylinder assemblies 19 and can be pushed over the flanges 16. In this way, simply, the desired closing pressure can be obtained and maintained.

As an example, on the top surface 20 of the slide 8, two ribs 21 are provided extending over the entire width of the slide 8, at right angles to the plane of drawing. The distance D between the end 22 of the ribs leading in the direction of movement, and the oppositely located surface 23 of the mold cavity is set with the slide 8 retracted, depending on the desired product wall thickness and the plastic to be used, while the distance is set to be larger according as the melt of the plastic is higher and/or the melting temperature of the plastic is lower.

With an apparatus according to FIGS. 1-3, a product can be formed, for instance a sheet with two hinges from thermoplast such as polypropylene or polyethylene, as follows.

The mold 2 is closed from the position shown in FIG. 1, as shown in FIG. 2. The distance D is then set at a suitable value, such that the space in the mold cavity 3 is relatively great. Through the inflow opening 14, under relatively low pressure, plastic is introduced into the mold cavity, for instance at a pressure of between 1 and 10 bars excess pressure. The filling pressure is selected such that a desired, short feed time is achieved without the material properties of the plastic being adversely affected and without undesirably high pressure occurring in the mold cavity. Then, at a relatively high speed, the slide 8 is moved forward, in the direction of the extended position, a shown in FIG. 3, by moving the wedges 9. Here, the speed is selected dependent on the desired adiabatic heat development which should be such that the temperature of the plastic is at least substantially increased to approximately the melting temperature thereof. Plastic that is, possibly, slightly solidified becomes liquid again and can be forced further into the mold so that a complete filling of the mold cavity is obtained while the product can have wall thicknesses which are, in fact, too small for the melt flow index of the respective plastic/product combination. Optionally, after removing the slide, some hold pressure can still be given with the aid of the injection device 15, so that undesired stresses can be pressed from the product.

After that, the mold can be opened again and the product can be taken out.

Preferably, the rate of movement of the or each slide is high such that the time of movement of the slide between the retracted and the extended position is relatively short with regard to the cycle time for the manufacture of a product, for instance between 0 and 10% of that time, also depending on the desired adiabatic heating. This can be determined by way of an experiment for each plastic-product combination or be calculated with the aid of standard tables regarding plastics, the product properties such as dimensions and flow paths, the friction which will occur when moving the slide and the heat capacity and melt temperature of the plastic.

In FIG. 4, an alternative embodiment of an apparatus according to the invention is shown, wherein screw spindles 25 with nut blocks 26 are used for opening and closing the mold 2. These can be wholly or partly included in the mold 2. In this embodiment, the plastic is introduced via a side inflow opening 14 and a slide 8 is provided on both sides of the mold cavity 3. In this embodiment, they can be moved independently of each other but it is preferred that they be moved in coupled relation, so that a symmetrical load occurs in the mold 2.

Figure 5:
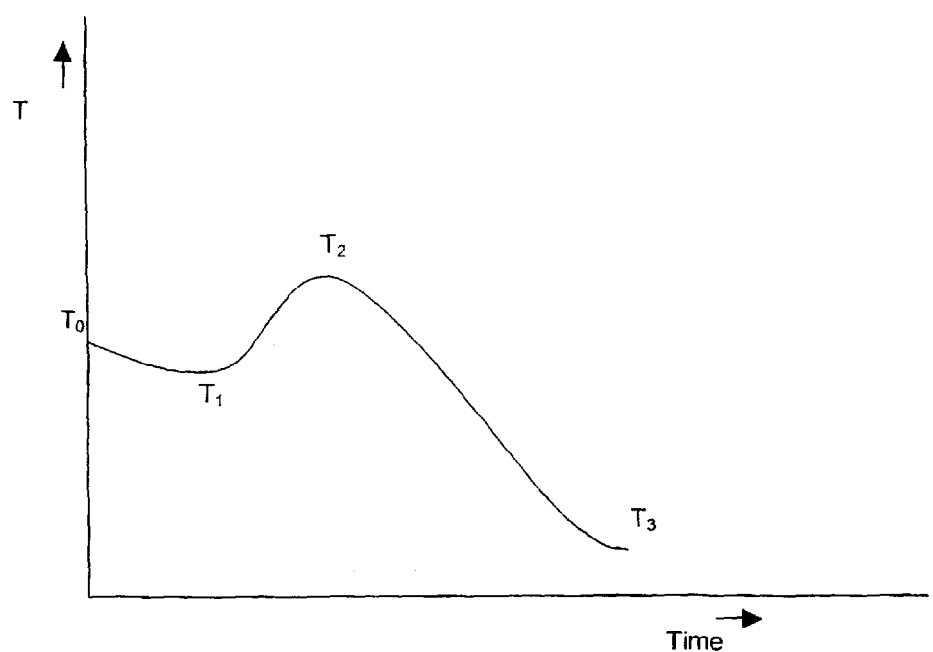
FIG. 5 is a graph showing the temperature in the plastic in a mold according to the invention during an injection molding cycle, plotted against time.

By way of illustration, an embodiment of a mold and method according to the invention will be described. As a product example, a plastic file is taken. In Table 1, the data of the injection molding machine are included, in Table 2 the mold data, in Table 3 the product dimensions, in Table 4 the data about the slides or pressure plate and in Table 5 data involving the operation parameters. In Table 6, the pressures and speeds used during an injection molding cycle are given. Thereupon, in FIG. 5, the temperature in the plastic in a mold according to the invention during an injection molding cycle is given, plotted against time.

TABLE 1

| Machine Data | |
| --- | --- |
| Machine | Stork SX 3000-2150 |
| Machine Number | X 2936 |
| Year of Construction | 2000 |
| Main Feed | 400 V 50 Hz |

TABLE 1-continued

| Machine Data | |
| --- | --- |
| Main Current | 354 A |
| Control Voltage | 24 V |
| Max Oil Pressure | 210 bar |
| Max Air Pressure | 8 bar |
| Weight Closing Force | 8700 kg |
| Weight Injection Force | 5000 kg |
| Screw diameter | 65 mm |

TABLE 2

| Mold Data | |
| --- | --- |
| Length | 1050 mm |
| Width | 455 mm |
| Height | 495 mm |
| Number of Cavities | 1 |

TABLE 3

| Product Size | |
| --- | --- |
| Length | 655 mm |
| Width | 320 mm |
| Thickness | 1.7 mm |

TABLE 4

| Pressure Plate Data | |
| --- | --- |
| Cylinder Stroke | 50 mm |
| Cylinder Diameter | 80 mm |
| Operating Pressure | 300 bar |
| Wedge Angle | 4° |

TABLE 5

| Parameters | |
| --- | --- |
| Mold Temperature | 50° |
| Temperature at Introduction | 245° |
| Dosing | 128 mm |
| Shot Weight | 295 gram |
| Impact of the Pressure Plate | 80 mm |
| Decompression | 10 mm |
| Closing Force | 150 ton |
| Hold Pressure | 25 bar |
| Thrust | 20 bar |
| Speed of Impact | 0.4 S |

TABLE 6

| Cycle Time | | | |
| --- | --- | --- | --- |
| | Sub Time | At Time | Total Time |
| Closing | 0.750 S | T = 0.000 S | 0.750 S |
| Injection | 0.171 S | 0.750 S | 0.921 S |
| Impact Pressure Plate | 0.400 S | 0.857 S | 1.257 S |
| Cooling | 12.000 S | 1.257 S | 13.257 S |
| Opening | 1.000 S | 13.257 S | 14.257 S |
| Handling | 5.000 S | 14.257 S | 19.257 S |

With a method according to the invention, at a time 0, with the mold closed, an amount of plastic was introduced into the mold cavity, sufficient for manufacturing an end product, in this case a file. In 0.1706 sec, a shot weight of 128 grams of PP was introduced into the mold cavity. The mold cavity comprised a slide with a frontal surface of approximately 200,000 mm$^2$, which was moved over a distance of 1.8 mm. The plastic was introduced, at a temperature of approximately 245° C. at a speed of 750 mm/s, without pressure, at a mold temperature of approximately 50° C., and was cooled down in a first phase to approximately 230° C. At the time T1, after approximately 0.107 seconds, the slide was set in motion, which slide was moved completely forwards in approximately 0.4 sec, while the temperature in the mold rose to just below the temperature at which the plastic will decompose. From the time T2, at which the slide was completely moved forward and was held in that position, the plastic was allowed to cool down to a temperature well below the melting temperature, close to room temperature, for instance 45 to 55° C. This cooling down was done in approximately 12 seconds. Apart from two living hinges, the product thickness on the covers and the back was on average 1.7 mm by, viewed in frontal surface, 655 mm by 320 mm. During cooling down, the application of hold pressure was not necessary, as a result of the fact that no shrinkage needed to be absorbed. The product appears to be free of stress, so that a high form-stability is obtained.

As a result of the high speed of the slide, kinetic speed is converted to heat, while, moreover, friction between the plastic and the mold as well as in the plastic itself and the compression leads to adiabatic heat development. Until approximately the moment T2 the slide is completely moved forward, the plastic in the mold is kept in motion and, furthermore, kept above the melting temperature, so that solidification is prevented and the flow behavior of the plastic is positively influenced. As a result, a complete filling of the mold cavity is obtained with limited closing force and filling pressure.

The mold was moved with wedges with a wedge angle of approximately 4°.

With a method according to the invention as described herein, the slide is already moved to the extended position while the plastic is being injected into the mold cavity. This also contributes to the plastic being kept in motion.

Figure 6:
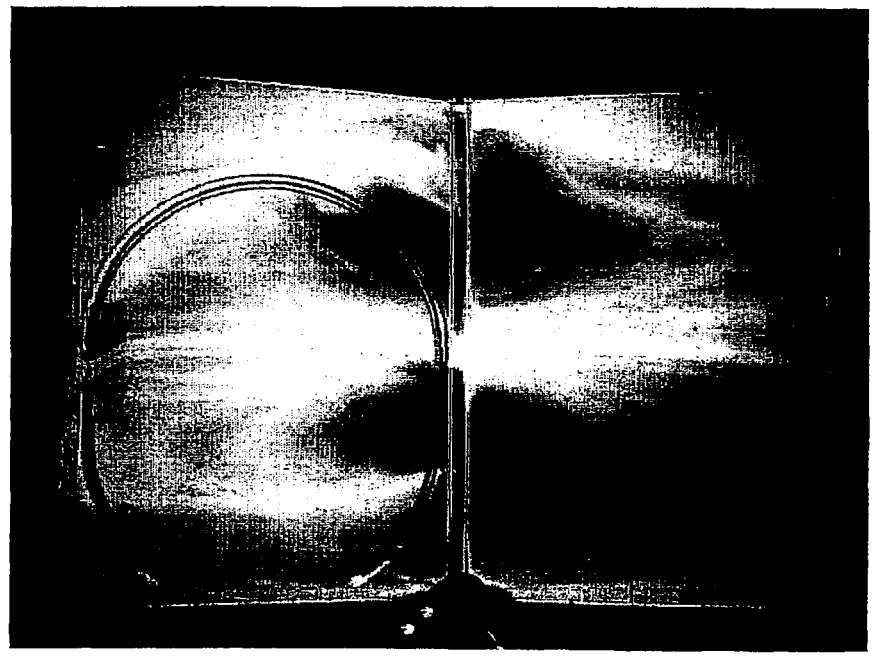
FIG. 6 shows a depiction of a CD-box manufactured according to the invention, photographically recorded using colorant.

In FIG. 6, a photographic depiction is given of a CD-box manufactured with a method according to the invention. Here, the flow pattern of the plastic is clearly visible. FIG. 6 is to be explained as follows.

With conventional injections, a tangle of lines would be visible. With conventional injecting, these lines are caused by plastic being supplied under pressure. A very dark, confused pattern becomes visible and indicates the presence of stresses in the material. Conversely, in this picture, a particularly quiet image presents itself with attractive, long threaded light patterns. A slight hold pressure causes the two dark spots around the points of injection. In itself, this hold pressure is not necessary but hold pressure can be advantageous for further improving the product, in particular the flatness thereof. The slightly darker spots near the center are the result of this hold pressure which, clearly, has remained particularly limited.

Figure 7:
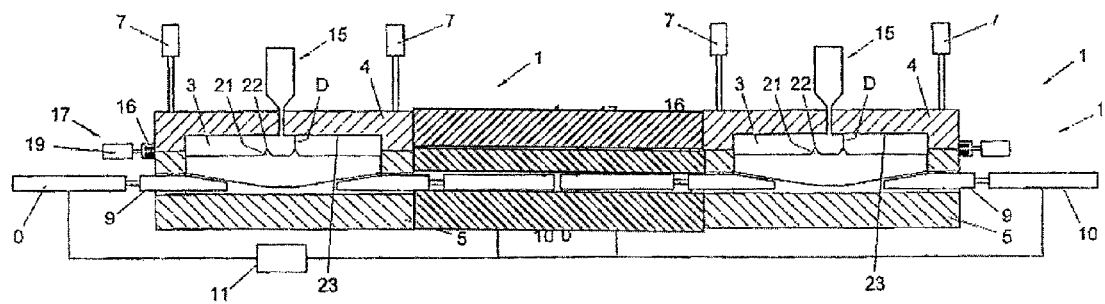
FIG. 7 shows, in partly cross-sectional side view, an apparatus according to the invention with two mold cavities, each having a slide.
Figure 8:
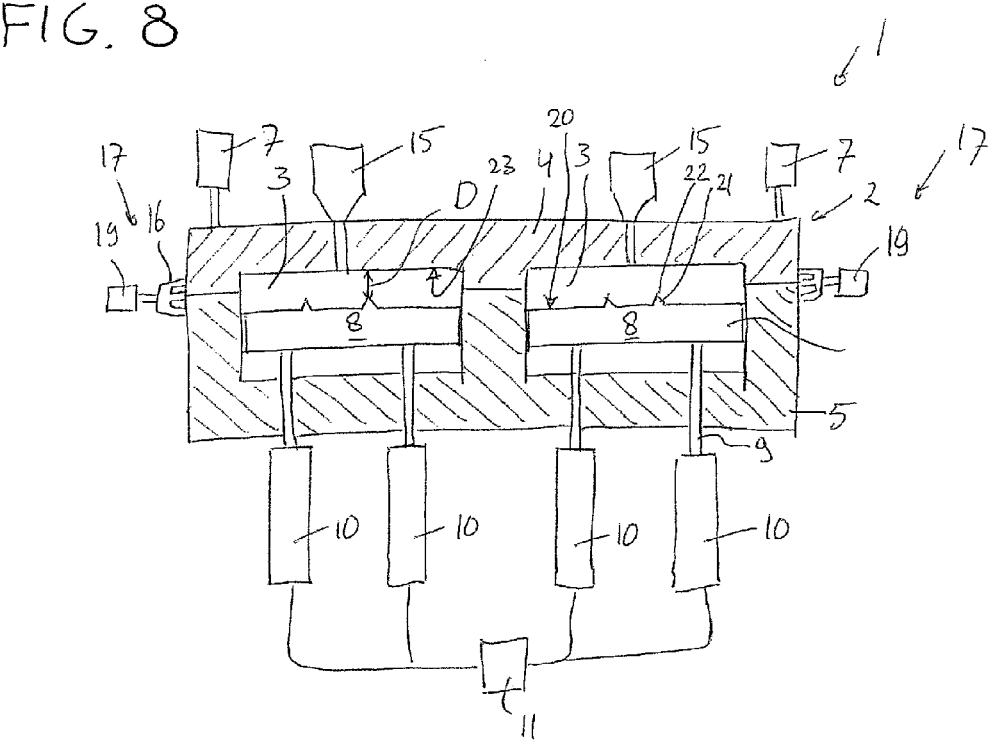
FIG. 8 shows, in partly cross-sectional side view, an alternative embodiment of an apparatus according to the invention with two mold cavities.

The invention is not limited in any manner to the embodiments represented in the drawing and the description. Many variations thereon are possible within the framework of the invention as outlined by the claims. For instance, a mold 2 according to the invention can comprise several mold cavities, while the or each mold cavity can be provided with one or more slides, as shown in FIGS. 7 and 8. The slides can be driven in different manners, for instance directly, as shown in FIG. 7, instead of by the wedges, as shown in FIG. 8, and with the aid of different means, for instance electrically. Also, the slides can move in different directions, for instance approximately at right angles to the direction of movement of the mold parts, or be pivoted for reducing the space in the mold cavity.

These and many comparable adaptations are possible within the framework of the invention as outlined by the claims.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. An apparatus for manufacturing products from a thermoplastically deformable plastic material, the apparatus comprising:
    a mold having first and second mold parts defining at least one mold cavity;
    a slide movably disposed within the at least one mold cavity of the mold, said slide being movable in a forward direction from a first position at least partly retracted within the mold cavity to a second forward position, wherein said mold cavity defines a first volume when said slide is in said first position, and wherein said mold cavity defines a second volume when said slide is in said second forward position, said first volume being greater than said second volume;
    movement means for moving the slide;
    closing means for moving the first and second mold parts together and apart, thereby opening and closing the mold such that the mold cavity is released or closed, respectively;
    feed means for introducing, with the mold cavity closed, said material in at least substantially plastic condition into the mold cavity, said feed means including an injection inlet disposed opposite said slide in said forward direction; and
    a central control unit for controlling said movement means and said closing means, wherein the movement means for moving the slide are arranged for moving said slide in the forward direction in the mold cavity toward said injection inlet from a position at least partly retracted within the mold cavity such that said material is displaced in the mold cavity for obtaining the filling thereof.

2. An apparatus according to claim 1, wherein the closing means are at least substantially included in the mold.

3. An apparatus according to claim 2, wherein the closing means further comprise blocking means for holding the mold in closed position.

4. An apparatus according to claim 1, wherein the movement means comprise cooperating elements, at least one element of which is at least partly wedge-shaped, the arrangement being such that upon movement of one of the elements in a first direction, the slide connected thereto is moved in a second direction.

5. An apparatus according to claim 1, wherein the mold cavity comprises at least one forming part for forming a product part, wherein the slide is provided in or adjacent said forming part and which has a direction of movement substantially parallel to a wall thickness of said product part, while, with the slide in the first, at least partly retracted position said forming part defines a first passage, said first passage having a cross-section larger than a cross-section of said product part, and in the second, forward position, defines a second passage which corresponds to the cross section of the product part to be formed in said product forming part.

6. An apparatus according to claim 5, wherein the second passage, with the slide in the second position, is at least partly smaller than is necessary for the plastic material to flow past said second passage while, with the slide in the first position, the first passage is greater than is necessary for the plastic material to flow past said first passage.

7. An apparatus according to claim 1, wherein the feed means are arranged for introducing the material into the mold at a pressure lower than a required injection pressure when using a mold without slides for forming a same product from the same material.

8. An apparatus according to claim 1, wherein the slide, viewed in direction of movement, has a frontal surface, said frontal surface having a surface area greater than 25% of the projected surface of the mold cavity viewed in said direction of movement.

9. An apparatus according to claim 8, wherein said frontal surface is more than 50% of said projected surface.

10. An apparatus according to claim 9, wherein said frontal surface is more than 75% of said projected surface.

11. An apparatus according to claim 10, wherein said frontal surface is more than 85% of said projected surface.

12. An apparatus according to claim 11, wherein said frontal surface is between 90% and 100% of said projected surface.

13. An apparatus according to claim 1, wherein said second volume of said mold cavity is substantially equal to the volume of the product to be formed in said mold.

14. An apparatus according to claim 1, wherein said movement means comprises a piston-cylinder assembly hydraulically driven from said central control unit for directly driving said slide.

15. An apparatus according to claim 1, wherein said slide is driven electrically.

16. An apparatus according to claim 1, wherein said slide is disposed at a location within said mold cavity of said mold where the smallest wall thickness is provided in a product and/or at the location where the mold cavity defines flow paths having the greatest length.

17. An apparatus according to claim 1, wherein said slide is disposed within said mold cavity of said mold such that said slide is free to be pushed back toward said first position by said material being introduced into said mold cavity by said feed means.

18. An apparatus according to claim 1, wherein said slide is provided with a rib on a surface facing said mold cavity for forming a narrowing portion in the product.

19. An apparatus according to claim 1, wherein said central control unit is adapted to start movement of said slide directly prior to completing the filling of said material into said mold cavity.

20. An apparatus according to claim 1, wherein said mold defines a plurality of mold cavities, each of said mold cavities having a slide movably disposed therein and being movable in a forward direction from a first position at least partly retracted within the mold cavity to a second forward position, wherein said mold cavity defines a first volume when said slide is in said first position, and wherein said mold cavity defines a second volume when said slide is in said second forward position, said first volume being greater than said second volume.

* * * * *